(12) United States Patent
Sugitani

(10) Patent No.: US 7,308,346 B2
(45) Date of Patent: *Dec. 11, 2007

(54) STEERING DEVICE

(75) Inventor: Nobuo Sugitani, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 11/169,811

(22) Filed: Jun. 29, 2005

(65) Prior Publication Data
US 2006/0047389 A1  Mar. 2, 2006

(30) Foreign Application Priority Data
Aug. 31, 2004 (JP) ............................. 2004-252087

(51) Int. Cl.
*B62D 6/00* (2006.01)
(52) U.S. Cl. .................... 701/41; 701/42; 180/402; 180/403
(58) Field of Classification Search ................. 701/41, 701/42, 43; 180/402, 403
See application file for complete search history.

(56) References Cited

U.S. PATENT DOCUMENTS

| | | | |
|---|---|---|---|
| 5,247,441 A | | 9/1993 | Serizawa et al. |
| 5,908,457 A | * | 6/1999 | Higashira et al. ............. 701/41 |
| 6,059,068 A | * | 5/2000 | Kato et al. ................... 180/402 |
| 6,308,122 B1 | * | 10/2001 | Nishizaki et al. ............. 701/41 |
| 6,389,342 B1 | * | 5/2002 | Kanda ........................... 701/41 |
| 6,823,245 B2 | * | 11/2004 | Sugitani et al. .............. 701/29 |
| 6,859,704 B2 | * | 2/2005 | Aoki et al. .................... 701/41 |
| 6,886,656 B2 | * | 5/2005 | Fujioka et al. .............. 180/402 |
| 2004/0148077 A1 | * | 7/2004 | Yasui et al. ................... 701/41 |
| 2004/0211618 A1 | * | 10/2004 | Ogawa et al. ............... 180/402 |

FOREIGN PATENT DOCUMENTS

| | | |
|---|---|---|
| EP | 1 304 276 | 4/2003 |
| JP | 2003-127886 | 5/2003 |

OTHER PUBLICATIONS

German Office Action dated Jun. 26, 2007, English Translation enclosed.

* cited by examiner

*Primary Examiner*—Gertrude A. Jeanglaude
(74) *Attorney, Agent, or Firm*—Hamre, Schumann, Mueller & Larson, PC

(57) ABSTRACT

A steering device with a constitution in which an operation unit and steerable wheels are not mechanically connected, has a target turning angle setting device which sets a target turning angle of the steerable wheels according to an operation amount of the operation unit, a turning angle measuring device which measures an actual turning angle of the steerable wheels, and a turning actuator which turns the steerable wheels according to a deviation between the target turning angle and the actual turning angle, wherein, when an operating direction of the operation unit is reversed, the target turning angle setting device sets the target turning angle according to the actual turning angle which is measured by the turning angle measuring device at a time of reversing.

4 Claims, 5 Drawing Sheets

STEERING DEVICE

BACKGROUND OF THE INVENTION

1. Field of the Invention

The present invention relates to a steering device with a constitution in which a operation unit operated by a driver and steerable wheels which are steered are not mechanically connected, and may be made to connect from such a condition.

Priority is claimed on Japanese Patent Application No. 2004-252087, filed Aug. 31, 2004, the content of which is incorporated herein by reference.

2. Description of Related Art

Conventionally, in a so-called SBW (steer-by-wire) type steering device, there is no mechanical connection between the steering wheel (hereinafter also referred to as an operation unit) steered by the driver, and the steerable wheels (the vehicle wheels). Therefore, greater output is required of the turning actuator which actually applies the turning angle to the steerable wheels, than in a conventional steering system in which the steering wheel and the steerable wheels are linked mechanically, due to the fact that steering effort of the driver applied to the steering wheel is not directly transmitted to the turning actuator.

Furthermore, in an SBW type steering device, the physical rack end position on the steerable wheels side cannot be felt at the steering wheel side by the driver. Therefore, it is necessary to otherwise make the driver aware of so-called rack end bottoming that corresponds to the maximum turning angle.

One known method of making the driver aware of the maximum turning angle is to rapidly build up the steering reaction force when the steering angle (steering wheel angle) approaches an angle at which the turning angle reaches the maximum, thereby letting the driver know when the turning angle reaches the maximum (see, for example, U.S. Pat. No. 5, 247,441).

Incidentally, in the case of an SBW type steering device in which an electric motor is used for the turning actuator, there is a need for the output capacity of the turning actuator to be as low as possible from the viewpoint of decreasing manufacturing costs and power consumption.

However, if the output of the motor is not sufficient, the driver may be unable to adequately turn the steerable wheels to the turning angle intended by the driver, i.e., the target turning angle determined according to the steering angle, so that the driver experiences considerable unusual sensation. This unusual sensation is particularly marked at extremely low speeds where high turning output is required, such as when parking, for example.

Moreover, when the steerable wheels do not sufficiently approach the target turning angle according to the steering operation by the driver, i.e., when a motor of the turning actuator turns the steerable wheels at the maximum output, a phenomenon can occur in which, even if the driver reverses the steering direction of the steering wheel, the steerable wheels continue to be turned in the turning direction in which the steerable wheels had been turned in the first place.

At this time, even if the driver does not have a feeling that the steerable wheels are not responding properly, when the state is continued in which the steering direction of the steering wheel and the turning direction of the steerable wheels are reversed with respect to each other, a vehicular motion is showed in which the vehicle continues to be turned in the same direction (direction opposite to the steering direction) as the direction in which the vehicle has been turned until then, and after that, the vehicle begins to be turned in the same direction (same direction as the steering direction) as the direction of the intention-of the driver, and the driver will feel considerable unusual sensation.

SUMMARY OF THE INVENTION

The present invention is made in view of the above-mentioned situation, and an object thereof is to provide a steering device in which undesirable of vehicular motion which is caused in the case in which the steering direction and the turning direction are reversed with respect to each other is restrained.

To solve the problems mentioned above, the present invention is a steering device with a constitution in which an operation unit which a driver operates and steerable wheels which are steered are not mechanically connected, and may be made to connect from such a condition, having a target turning angle setting device which sets a target turning angle of the steerable wheels according to an operation amount of the operation unit, a turning angle measuring device which measures an actual turning angle of the steerable wheels, and a turning actuator which turns the steerable wheels according to a deviation between the target turning angle and the actual turning angle, wherein, when an operating direction of the operation unit is reversed, the target turning angle setting device sets the target turning angle according to the actual turning angle which is measured by the turning angle measuring device at a time of reversing.

According to the above-mentioned steering device, in the state in which the actual turning angle of the steerable wheels does not reach target turning angle according to the steering operation by the driver, even if the driver reverses the steering direction, the actual turning angle which is measured at this time is reflected in the target turning angle, and thereby inversion of the corresponding relation between the steering direction of the driver and the turning direction of the vehicle according to the actual turning angle can be prevented.

In addition, by setting the target turning angle according to the actual turning angle at the time when the driver reverses the steering direction, a deviation between the target turning angle and the actual turning angle can be decreased, or can be set to zero, and thereby the follow-up property of the actual turning angle with respect to the target turning angle can be improved.

Furthermore, in the steering device of the present invention, during a period from the time of reversing to a time when the operation unit reaches a neutral position, the target turning angle setting device may set the target turning angles according to the actual turning angle which is measured by the turning angle measuring device at the time of reversing.

According to the above-mentioned steering device, when the operation unit reaches the neutral position, the actual turning angle is controlled according to the target turning angle which is set by the target turning angle setting device, and thereby inversion of the corresponding relation between the steering direction of the driver and the turning direction of the vehicle according to the actual turning angle can be prevented, and it is possible to prevent the driver from experiencing unusual sensation when steering.

Furthermore, in the steering device of the present invention, a target modification ratio may be determined according to the actual turning angle and a standard target turning angle which is determined based on the operation amount of the operation unit and a vehicle speed at the time of reversing, and the target turning angle setting device may set the target turning angles according to the target modification ratio and the standard target turning angles at times during the period.

Moreover, in the steering device of the present invention, a standard steering ratio may be determined according to the actual turning angle and the operation amount of the operation unit at the time of reversing, and the target turning angle setting device may set the target turning angles according to the standard steering ratio and the operation amounts of the operation unit at times during the period.

DETAILED DESCRIPTION OF THE INVENTION

In the following, a steering device according to an embodiment of the present invention is explained with reference to the figures.

Figure 1:
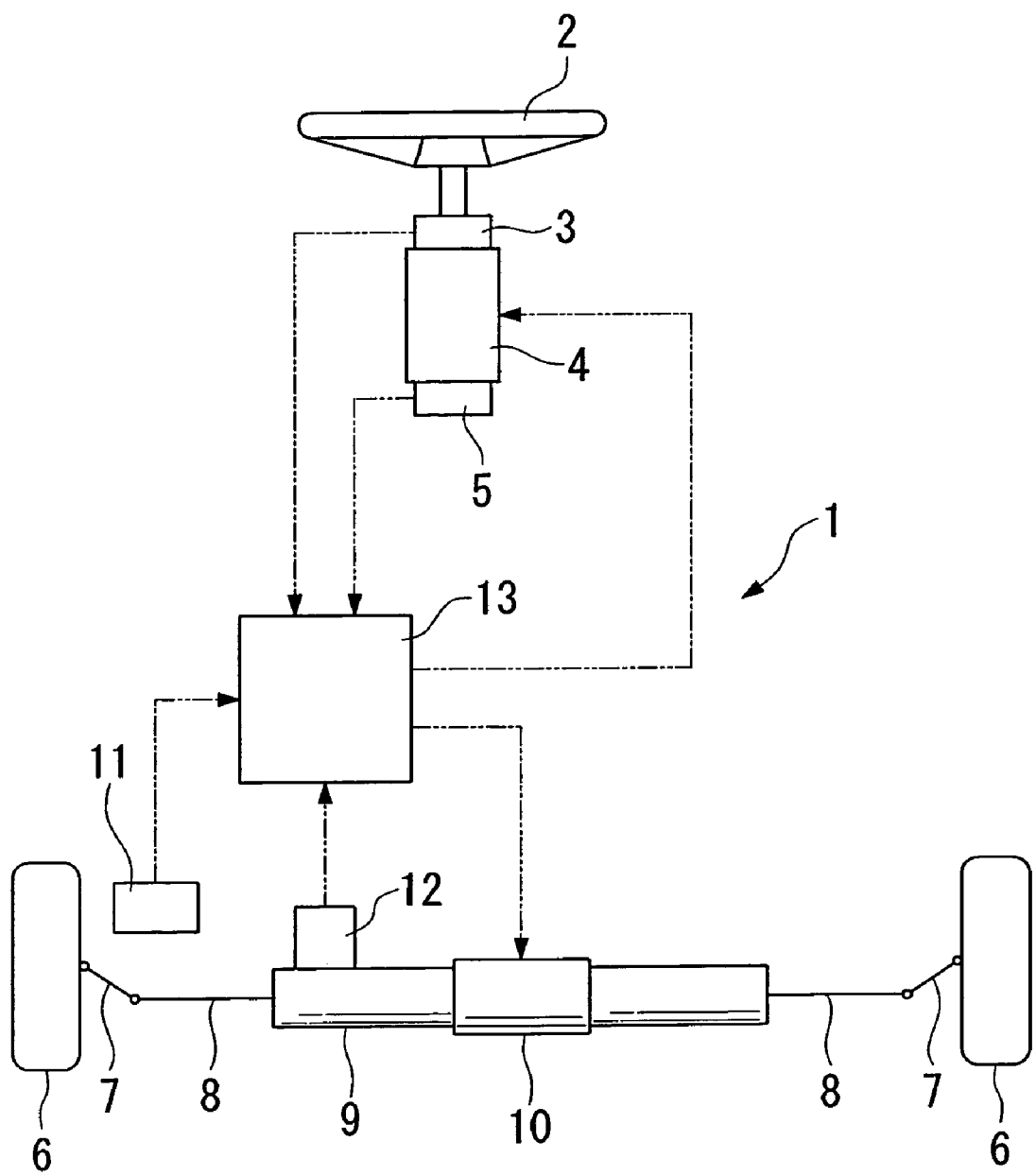
FIG. 1 is a configuration diagram of a vehicle according to an embodiment of the present invention.

As shown in FIG. 1, the steering device 1 according to the present embodiment has a steering wheel (operation unit) 2 steerable by a driver, a steering angle sensor 3, a steering reaction force application motor (reaction force actuator) 4, and a steering torque sensor 5 which are provided on the steering wheel 2, a steering rod 9 connected to left and right wheels (steerable wheels) 6 via knuckle arms 7 and tie rods 8, a steering motor (turning actuator) 10 which drives the steering rod 9 in an axial direction so as to apply a turning angle to the wheels 6, a vehicle speed sensor 11 which outputs vehicle speed (speed of the vehicle), a turning angle sensor (turning angle measuring device) 12 which outputs a turning angle of the wheels 6 based on a position of the steering rod 9 in the axial direction, and a control device 13 which controls the steering reaction force application motor 4 and the steering motor 10.

Figure 2:
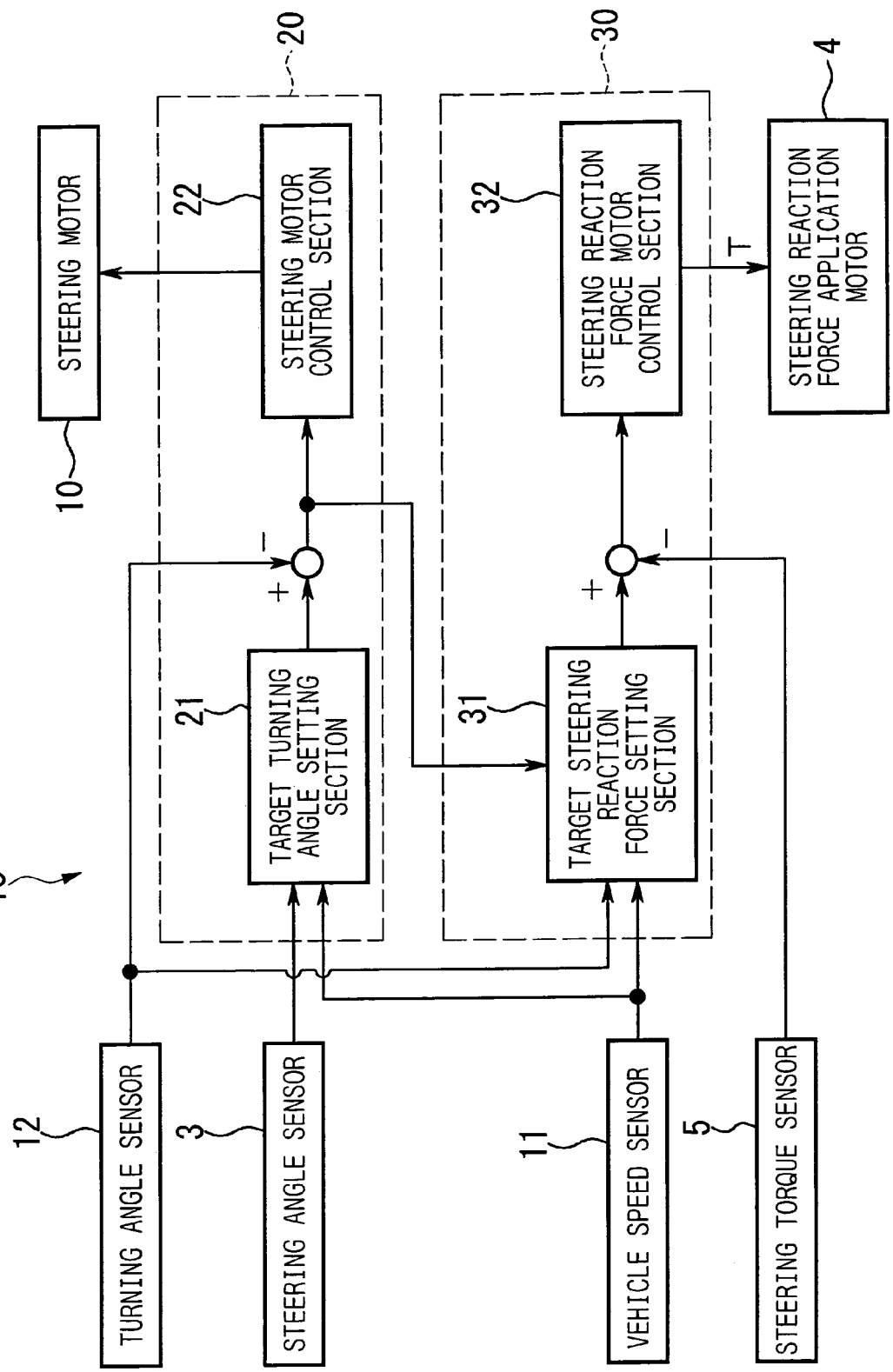
FIG. 2 is a block diagram of a steering device according to the embodiment of the present invention.

As shown in the block diagram in FIG. 2, the control device 13 has a turning control section 20 which controls the steering motor 10 based on the detection signals from the steering angle sensor 3, the vehicle speed sensor 11, and the turning angle sensor 12, and a steering reaction force control section 30 which controls the steering reaction force application motor 4 based on the control signal from the turning control section 20, and the detection signals from the steering torque sensor 5, the vehicle speed sensor 11, and the turning angle sensor 12. The control device 13 is capable of controlling the steering reaction force application motor 4 and the steering motor 10 separately.

The turning control section 20 has a target turning angle setting section (target turning angle setting device) 21 which sets a target turning angle based on a steering angle signal which includes a steering angle (steering wheel angle, or operation amount) and a steering direction of the steering wheel 2 from the steering angle sensor 3, and the vehicle speed signal from the vehicle speed sensor 11, and a steering motor control section 22 which controls the power supplied to the steering motor 10 so as to match the output value of the turning angle sensor 12, i.e., the actual turning angle of the wheels 6, to the target turning angle.

As a result, an optimum turning angle for the wheels 6 which takes into account the vehicle speed at the time is determined based on the steering angle applied to the steering wheel 2 by the driver.

The steering reaction force control section 30 has a target steering reaction force-setting section 31 which sets the target steering reaction force based on the vehicle speed signal from the vehicle speed sensor 11, the turning angle signal from the turning angle sensor 12, and the steering angle command signal from the turning control section 20, and a steering reaction force motor control section 32 which controls the power supplied to the steering reaction force application motor 4 so as to match the output value of the steering torque sensor 5 (actual steering torque) to the target steering reaction force set in the target steering reaction force-setting section 31.

As a result, a steering reaction force is applied to the steering wheel 2 in the direction opposite to the direction of steering operation by the driver, thereby giving the driver the feeling of steering as if the steering wheel 2 and the steerable wheels 6 were directly connected.

The steering device 1 according to the present embodiment has the above-mentioned constitution.

Next, the operation of the steering device 1, especially, in the case in which the driver reverses the steering direction of the steering wheel 2 in the state in which the steering wheel 2 is rapidly operated by the driver as compared with the maximum output of the steering motor 10 and the wheels have not reached the target turning angle which is intended by the driver, the actions for setting the control target turning angle $\lambda tt$, will be explained below with reference to the attached figures.

Figure 3:
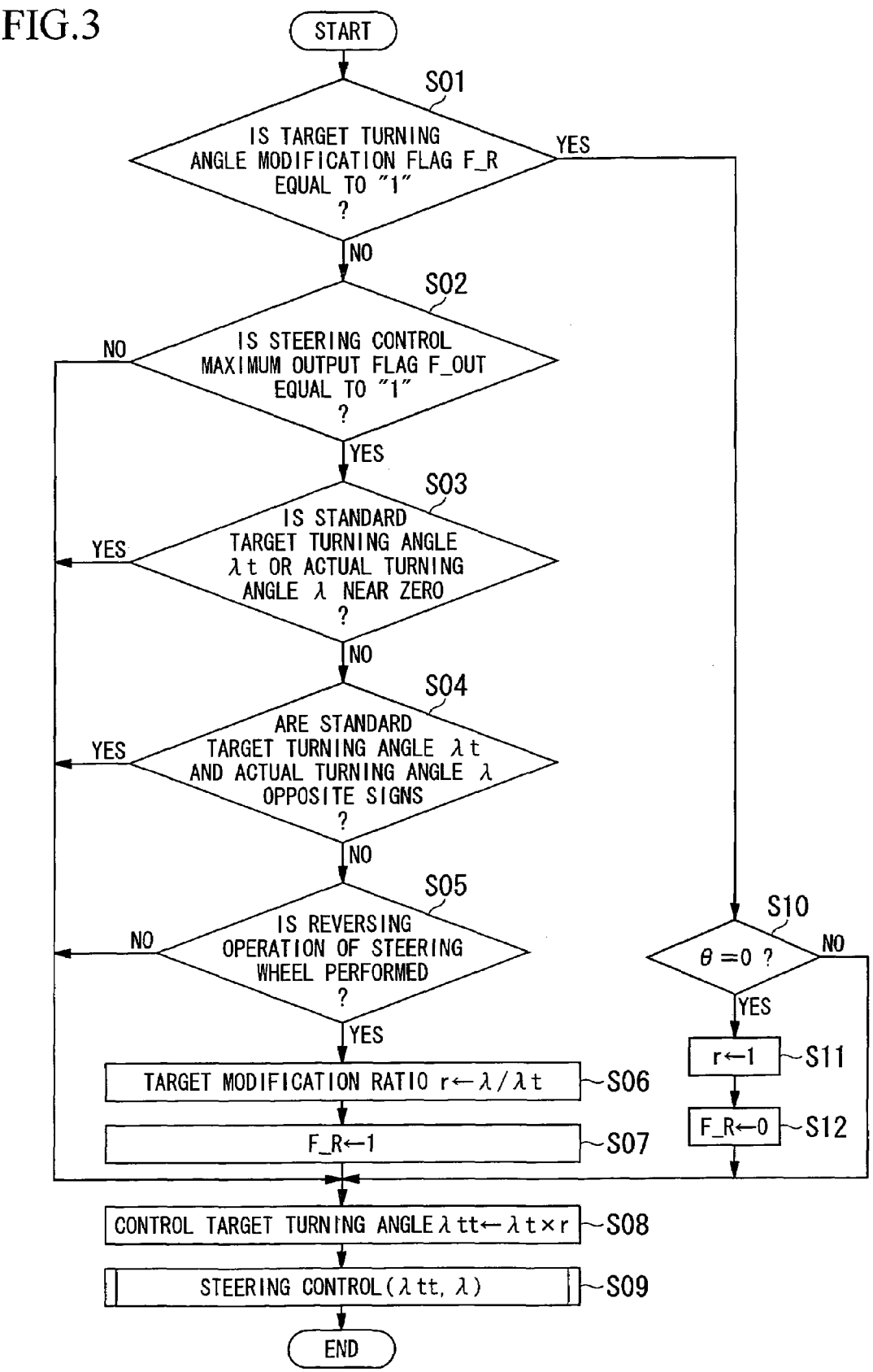
FIG. 3 is a flowchart showing a motion of the steering device shown in FIG. 2.

First, for example, in step S01 shown in FIG. 3, it is determined whether a flag value of a target turning angle modification flag F_R which indicates the state that a value which is obtained by adjusting a standard target turning angle $\lambda t$ which is described below is set as the control target turning angle $\lambda tt$ is "1".

When this determination result is "YES", the flow proceeds to step S10 which is described below.

On the other hand, when this determination result is "NO", the flow proceeds to step S02.

In step S02, it is determined whether a flag value of a steering control maximum output flag F_OUT which indicates that the output of the steering motor 10 has already reached the maximum output is "1".

When this determination result is "NO", the flow proceeds to step S08 which is described below.

On the other hand, when this determination result is "YES", i.e., when, because the output of the steering motor 10 has already reached the maximum output, there is a possibility that the actual turning angle $\lambda$ does not match the standard target-turning angle $\lambda t$ which is set based on the steering angle signal and the vehicle speed signal, the flow proceeds to step S03.

In step S03, it is determined whether the standard target turning angle $\lambda t$ or the actual turning angle $\lambda$ is a value near zero.

When this determination result is "YES", i.e., when it is a possibility that a response error in the case in which the actual turning angle $\lambda$ is changed with respect to the standard target turning angle $\lambda t$, a detection error of the actual turning angle $\lambda$, or the like is relatively increased, the flow proceeds to step S08.

On the other hand, when this determination result is "NO", the flow proceeds to step S04.

In step S04, it is determined whether the standard target turning angle $\lambda t$ and the actual turning angle $\lambda$ have opposite signs.

When this determination result is "YES", i.e., when it is a possibility that the sign of the actual turning angle $\lambda$ is inverted with respect to the standard target turning angle $\lambda t$, the flow proceeds to step S08 which is described below.

On the other hand, when this determination result is "NO", the flow proceeds to step S05.

In step S05, it is determined whether the steering direction of the steering wheel 2 is reversed.

When this determination result is "NO", the flow proceeds to step S08 which is described below.

On the other hand, when this determination result is "YES", the flow proceeds to step S06.

Next, in step S06, as a target modification ratio "r" for adjusting the standard target turning angle $\lambda t$, a value ($\lambda/\lambda t$) which is obtained by dividing the actual turning angle $\lambda$ by the standard target turning angle $\lambda t$ is set.

Next, in step S07, "1" is set as a flag value of the target turning angle modification flag F_R.

Next, in step S08, for the control target turning angle $\lambda tt$, a value ($\lambda t \times r$) which is obtained by multiplying the standard target turning angle $\lambda t$ and the target modification ratio r is set.

Next, in step S09, steering control in which driving control of the steering motor 10 is performed so that a difference between the control target turning angle $\lambda tt$ and the actual turning angle $\lambda$ becomes zero by, for example, PI (proportional integration) control, or the like is performed, and the series of processes is terminated.

Moreover, in step S10, it is determined whether the steering angle $\theta$ is zero.

When this determination result is "NO", the flow proceeds to step S08.

On the other hand, when this determination result is "YES", the flow proceeds to step S11.

In step S11, "1" is set as the target modification ratio "r".

Next, in step S12, "0" is set as the flag value of the target turning angle modification flag F_R, and the flow proceeds to step S08 which is described above.

Figure 4:
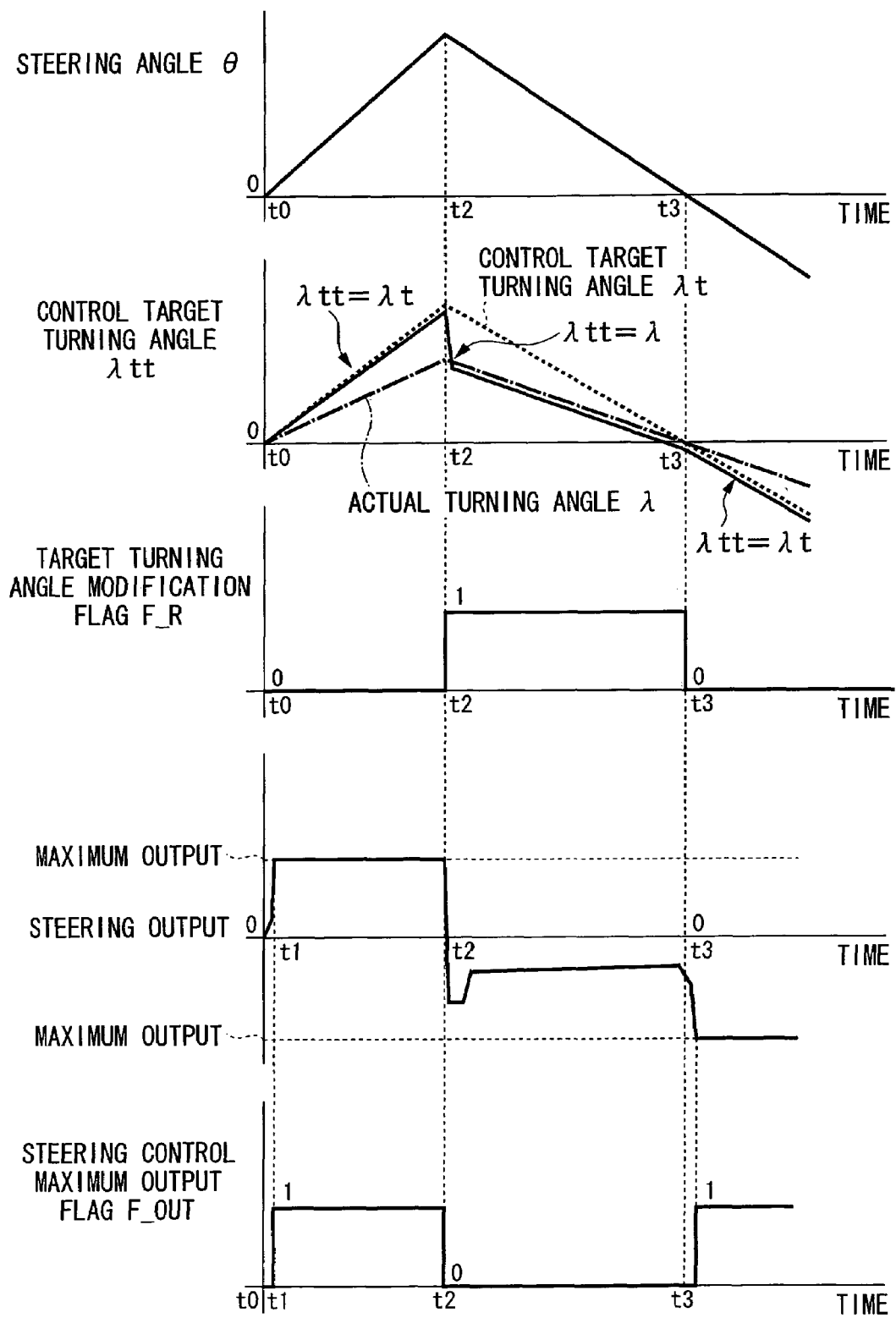
FIG. 4 is a graphical view showing an example of change over time of a control target turning angle $\lambda tt$ in the steering device shown in FIG. 2.

For example, at and after the time t0 shown in FIG. 4, accordingly as the steering angle $\theta$ in a desired steering direction by the driver is increased the standard target turning angle $\lambda t$ which is set based on the steering angle signal and the vehicle speed signal is increased, and when the output of the steering motor 10 reaches the maximum output at and after the time t1, in the control in which the standard target turning angle $\lambda t$ is set as the control target turning angle $\lambda tt$, the following delay of the actual turning angle $\lambda$ with respect to the control target turning angle $\lambda tt$ is increased, and the difference between the control target turning angle $\lambda tt$ and the actual turning angle $\lambda$ is increased.

In this state, for example, at the time t2, when the steering direction by the driver is reversed, the standard target turning angle $\lambda t$ which is set based on the steering angle signal and the vehicle speed signal is decreased.

For this reason, for example, at and after the time t2, when the control in which the standard target turning angle $\lambda t$ is set as the control target turning angle $\lambda tt$ is continued, a state in which the actual turning angle $\lambda$, which has following delay with respect to the control target turning angle $\lambda tt$, which is decreased, continues to be increased, occurs.

In contrast, in the above-mentioned embodiment, at a proper timing on and after the time t2 when the standard target turning angle $\lambda t$ is decreased, the actual turning angle $\lambda$ is set as the control target turning angle $\lambda tt$, a ratio between the actual turning angle $\lambda$ and the standard target turning angle $\lambda t$ at this time is put in memory as the target modification ratio "r" ($=\lambda/\lambda t$), and at and after this timing, control is performed in which a value ($\lambda t \times$"r") in which the target modification ratio "r" is influenced by the standard target turning angle $\lambda t$ which is set based on the steering angle signal and the vehicle speed signal is set as the control target turning angle $\lambda tt$.

Thereby, it is possible to prevent the steering direction of the driver and the turning direction of the vehicle according to the actual turning angle $\lambda$ from being reversed, i.e., it is possible to prevent the vehicle from being turned in the same direction (i.e., the direction opposite to the steering direction by the driver) as the direction before the steering direction by the driver is reversed, and after that, the vehicle begins to turn in the direction (i.e., the same direction as the steering direction) in which the driver intends to turn, and thereby it is possible to prevent vehicular motion of which unusual sensation is considerable from occurring.

Furthermore, the control in which the standard target turning angle $\lambda t$ is adjusted by the target modification ratio "r"; and is set as the control target turning angle $\lambda tt$ is stopped at a timing when, for example, the steering angle $\theta$ reaches zero at the time t3, and the steering wheel 2 reaches the neutral position, and by setting "1" as the target modification ratio "r", on and after time t3, control is begun in which the standard target turning angle $\lambda t$ which is set based on the steering angle signal and the vehicle speed signal is set as the control target turning angle $\lambda tt$.

As mentioned above, according to the steering device 1 of the present embodiment, in the state in which the actual turning angle $\lambda$ of the steerable wheels has the following delay with respect to the standard target turning angle $\lambda t$ according to the steering of the driver, even if the driver reverses the steering direction, the value ($\lambda/\lambda t$) which is obtained by dividing the actual turning angle $\lambda$ which is measured at this time by the standard target turning angle $\lambda t$ is set as the target modification ratio "r" in order to adjust the standard target turning angle $\lambda t$, and thereby inversion of the corresponding relation between the steering direction of the driver and the turning direction of the vehicle according to the actual turning angle $\lambda$ can be prevented, i.e., it is possible to prevent the vehicle from being turned in the same direction (the direction opposite to the steering direction) as the direction until then, and after that, the vehicle begins to turn in the direction (the same direction as the steering direction) in which the driver intends to turn, and thereby it is possible to prevent the vehicular motion of which unusual sensation is considerable from occurring.

In addition, by matching the control target turning angle $\lambda tt$ to the actual turning angle $\lambda$ at a timing when the driver reverses the steering direction, on and after this, a deviation between the control target turning angle $\lambda tt$ and the actual turning angle $\lambda$ can be decreased, or can be set to zero, and thereby the matching of the actual turning angle $\lambda$ with respect to the control target turning angle $\lambda tt$ can be improved.

Figure 5:
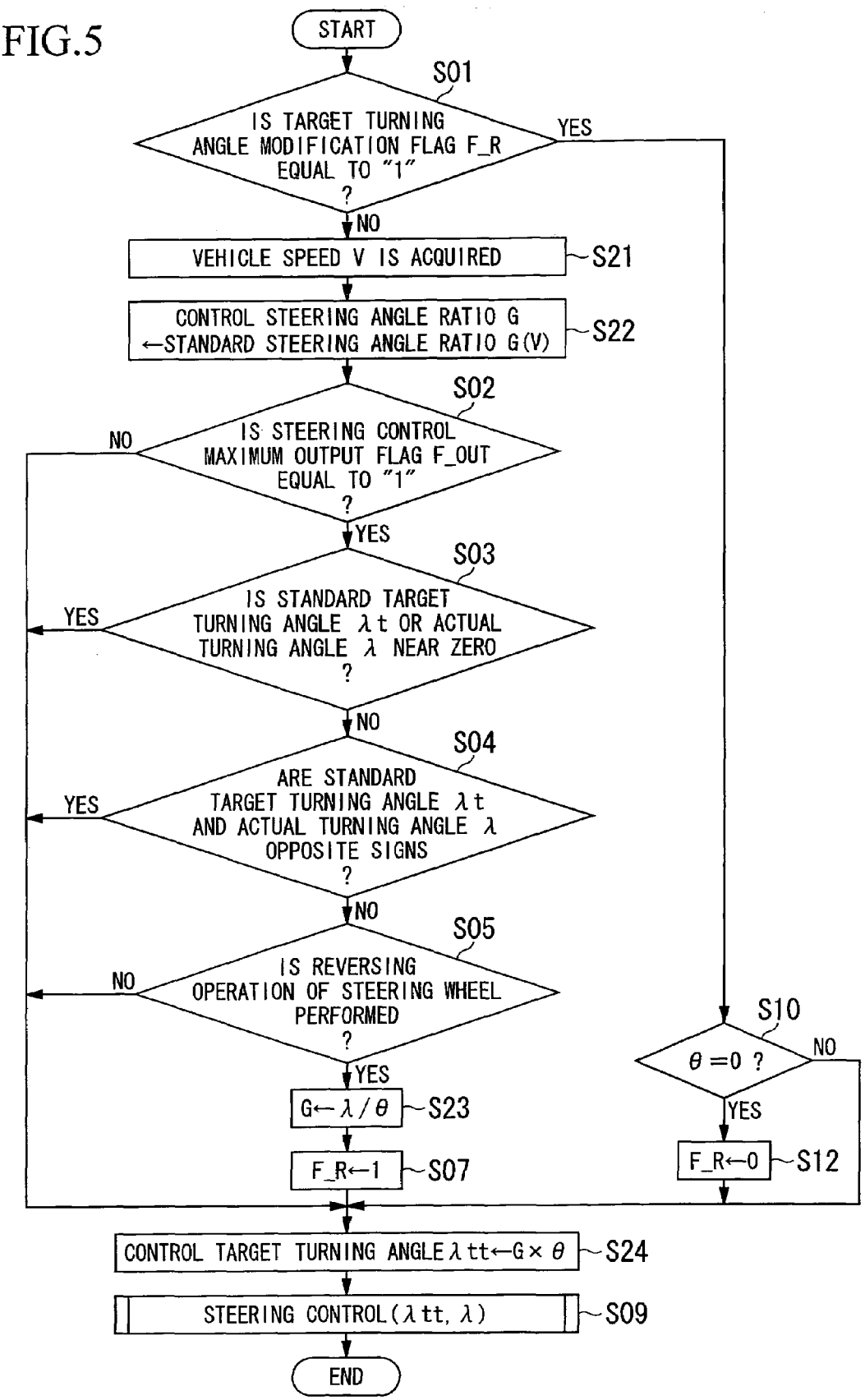
FIG. 5 is a flowchart showing a motion of the steering device according to a modified example of the present embodiment.

In addition, in the above-mentioned embodiment, although the control target turning angle $\lambda tt$ is set based on the standard target turning angle $\lambda t$ which is set based on the steering angle signal and the vehicle speed signal and the actual turning angle λ, it is not limited to this constitution. For example, as a modified example of the above-mentioned embodiment shown in FIG. 5, the control target turning angle λtt may be set based on the ratio between the steering angle and the turning angle which is set according to the vehicle speed signal, i.e., the standard steering ratio G (V).

That is, in this modified example, when the determination result of step S01 is "NO", the flow proceeds to step S21, and the vehicle speed V is acquired in step S21.

Next, in step S22, the standard steering ratio G (V) which is obtained by searching a map which indicates a predetermined relation between the vehicle speed V and the standard steering ratio G (V) which are previously put in memory by the vehicle speed V which is acquired is set as a control steering ratio G, and the flow proceeds to step S02.

Furthermore, in this modified example, step S11 in the above-mentioned embodiment is omitted, and, in place of step S06 and step S08, step S23 and step S24 are carried out.

That is, when the determination result of step S05 is "YES", the flow proceeds to step S23, and in step S23, the value (λ/θ) which is obtained by dividing the actual turning angle λ by the steering angle θ is set as the standard steering ratio G, and the flow proceeds to step S07.

Moreover, in step S24, the value (G×θ) which is obtained by multiplying the standard steering ratio G by the steering angle θ is set as the control target turning angle λtt.

While preferred embodiments of the invention have been described and illustrated above, it should be understood that these are exemplary of the invention and are not to be considered as limiting. Additions, omissions, secondary situations, and other modifications can be made without departing from the spirit or scope of the present invention.

For example, a constitution may be adopted in which, although the steering wheel 2 and the steerable wheels 6 can be mechanically connected via the clutch, normally, the clutch is not connected, and the steering wheel 2 and the steerable wheels 6 are not mechanically connected, and at a time when something unusual occurs, the clutch is connected, and the steering wheel 2 and the steerable wheels 6 are mechanically connected.

In addition, in the above-mentioned embodiment, in place of "turning angle", "rack stroke" of the steering rod 9 which has a predetermined interrelation therewith may be adopted. In this case, the standard target turning angle corresponds to a standard target rack stroke, the actual turning angle corresponds to an actual rack stroke, the control target turning angle corresponds to a control target rack stroke, and the target turning angle modification flag corresponds to a target rack stroke modification flag.

What is claimed is:

1. A steering device comprising:
   an operation unit operable by a driver and mechanically disconnected from steerable wheels which are to be steered;
   a target turning angle setting device which sets a target turning angle of the steerable wheels according to an operation amount of the operation unit;
   a turning angle measuring device which measures an actual turning angle of the steerable wheels; and
   a turning actuator which turns the steerable wheels according to a deviation between the target turning angle and the actual turning angle,
   wherein, when an operating direction of the operation unit is reversed, the target turning angle setting device sets the target turning angle according to the actual turning angle which is measured by the turning angle measuring device at a time of reversing.

2. A steering device according to claim 1, wherein, during a period from the time of reversing to a time when the operation unit reaches a neutral position, the target turning angle setting device sets the target turning angles according to the actual turning angle which is measured by the turning angle measuring device at the time of reversing.

3. A steering device according to claim 2, wherein a target modification ratio is determined according to the actual turning angle and a standard target turning angle which is determined based on the operation amount of the operation unit and a vehicle speed at the time of reversing, and the target turning angle setting device sets the target turning angles according to the target modification ratio and the standard target turning angles at times during the period.

4. A steering device according to claim 2, wherein a standard steering ratio is determined according to the actual turning angle and the operation amount of the operation unit at the time of reversing, and the target turning angle setting device sets the target turning angles according to the standard steering ratio and the operation amounts of the operation unit at times during the period.

* * * * *